Figure 1:
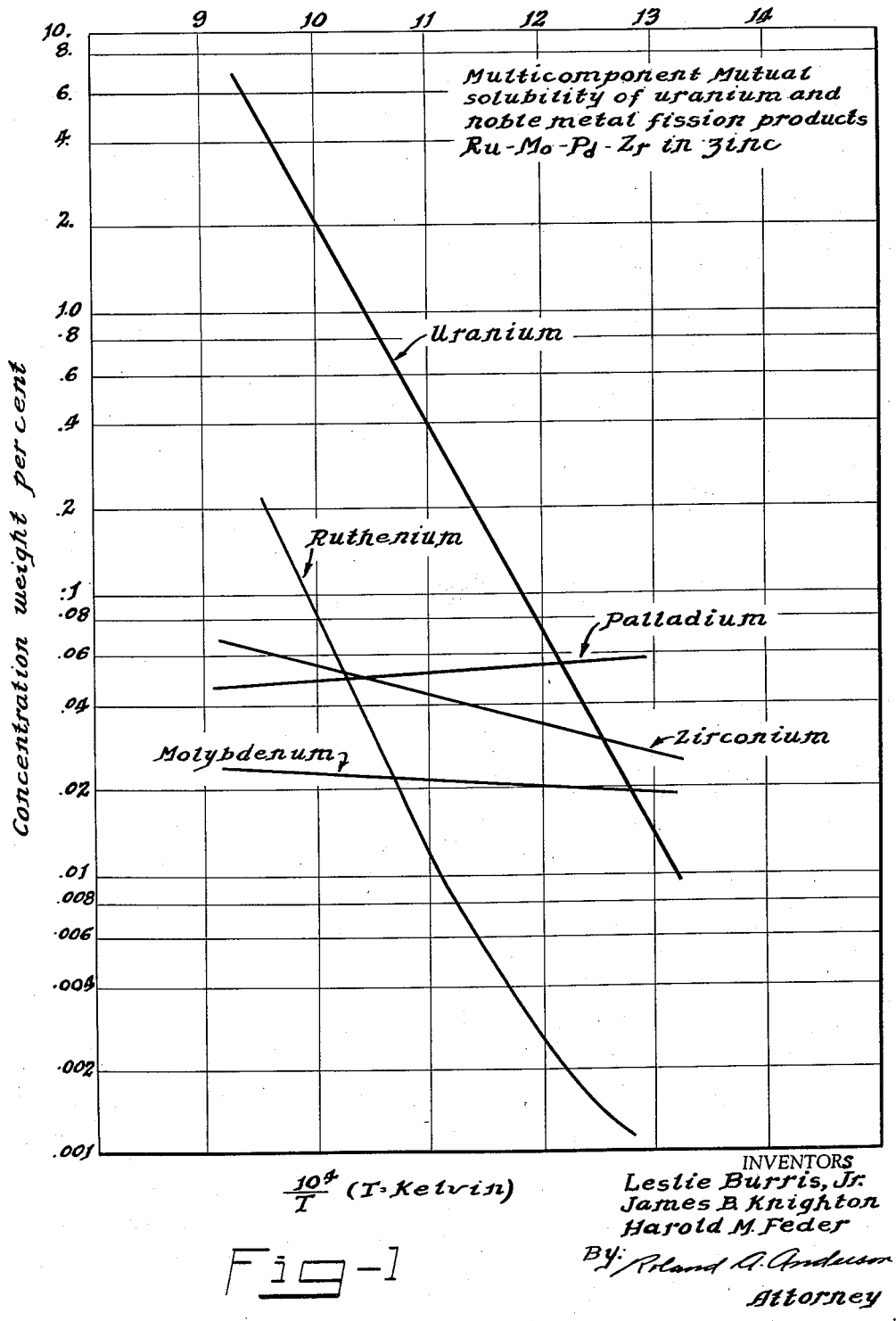

United States Patent Office 2,922,711
Patented Jan. 26, 1960

2,922,711

PRODUCTION OF PURIFIED URANIUM

Leslie Burris, Jr., James B. Knighton, and Harold M. Feder, Orland Park, Ill., assignors to the United States of America as represented by the United States Atomic Energy Commission Application June 11, 1957, Serial No. 665,105

10 Claims. (Cl. 75—84.1)

This invention relates to a pyrometallurgical method for producing purified uranium metal suitable for use as fuel in nuclear reactors.

Pyrometallurgical methods hold great promise for the future in processing fuels for nuclear reactors. Because such methods eliminate many steps required in conventional chemical methods and because the methods lend themselves readily to continuous and remote operation, these methods will undoubtedly be widely used in the future.

It is accordingly an object of the present invention to develop a method for producing uranium of a high degree of purity.

Another object of the present invention is to provide a method for processing spent reactor fuel elements.

Still another object of the present invention is to provide a method for reducing binary compounds of uranium to metallic uranium.

These and other objects of the present invention are satisfied by our novel method for the purification and production of uranium in which the uranium is dissolved in zinc, an intermetallic compound of uranium and zinc is crystallized from the zinc solution by cooling, the crystals are separated from the solution, and the intermetallic compound decomposed by vaporizing the zinc therefrom. If the uranium to be purified is originally present as a binary compound such as $UO_2$ or $UF_4$, the binary can be reduced to metallic uranium simultaneously to the purification thereof by employing a zinc-magnesium alloy to dissolve the uranium.

The invention is useful both in the production of uranium metal from ores and in the processing of spent fuel elements to recover the uranium therefrom.

The invention will first be described in relation to the purification of metallic uranium such as that contained in spent fuel elements. As is well-known, separation of the fission products from the uranium represents a problem of continuing interest to those skilled in the art.

The invention is of particular importance because separation of uranium from relatively non-oxidizable compounds, such as ruthenium and molybdenum, is obtained. For this reason the invention may be used along with the oxide drossing process described in U.S. patent application Serial No. 574,051 of Harold M. Feder and Norman R. Chellew, now Patent No. 2,822,260, which separates uranium effectively from other fission products.

According to the invention, the impure uranium is dissolved in zinc at about 800° C.; the resulting solution is cooled to about 500° C. and held at this temperature until fractional crystallization of an intermetallic compound of uranium and zinc having the formula $UZn_9$ occurs; the crystals are then separated from the remaining zinc by filtration through a graphite filter having 90-micron pores; and the intermetallic compound is vaporized at atmospheric pressure, at a temperature of 945° C. Additional recrystallizations may be performed if necessary to remove all fission products.

The equipment employed to carry out the method may be made of most refractory materials compatible with the use of zinc. For example, tantalum or recrystallized alumina may be used.

To show the purification obtained by fractional crystallization from a zinc solution, an alloy of the following composition was prepared. This alloy simulates nuclear reactor fuel in which there has been a build-up of fission products.

|  | Percent |
|---|---|
| Uranium | 91.46 |
| Ruthenium | 2.97 |
| Molybdenum | 3.73 |
| Zirconium | 1.03 |
| Palladium [1] | .81 |

[1] Used as rhodium equivalent.

This alloy was dissolved in zinc at a temperature of approximately 800° C. and the solution cooled by decrements. An analysis of the solution was made after every decremental cooling. The results follow:

Table I

| Temp., ° C. | U | Ru | Mo | Pd | Zr |
|---|---|---|---|---|---|
| 798 | 5.27 | .120 | .0176 | .049 | .0867 |
| 761 | 3.62 | .158 | .0244 | .046 | .0627 |
| 724 | 1.92 | .091 | .0230 | .051 | .0559 |
| 699 | 1.39 | .0467 | .0250 | .053 | .0548 |
| 678 | .92 | .0280 | .0192 | .054 | .0479 |
| 649 | .52 | .0157 | .0200 | .053 | .0436 |
| 629 | .30 | .0115 | .0181 | .055 | .0426 |
| 605 | .20 | .0075 | .0212 | .055 | .0415 |
| 575 | .085 | .0035 | .0207 | .039 | .0362 |
| 550 | .052 | .0021 | .0216 | .045 | .0351 |
| 525 | .031 | .0014 | .0230 | .059 | .0296 |

These results are plotted on Fig. 1 of the drawing. Reference to this figure shows clearly that substantially all the palladium remains in solution as the temperature is reduced. Likewise that part of the molybdenum which went into solution at 800° C. remained in solution at 525° C. Therefore uranium can be separated from these elements by fractional crystallization. Also about one-half the zirconium remains in solution and purification to this degree can be obtained by a single fractional crystallization. The solubility of ruthenium on the other hand decreases as the temperature is reduced and the ruthenium therefore remains with the uranium.

Figure 2:
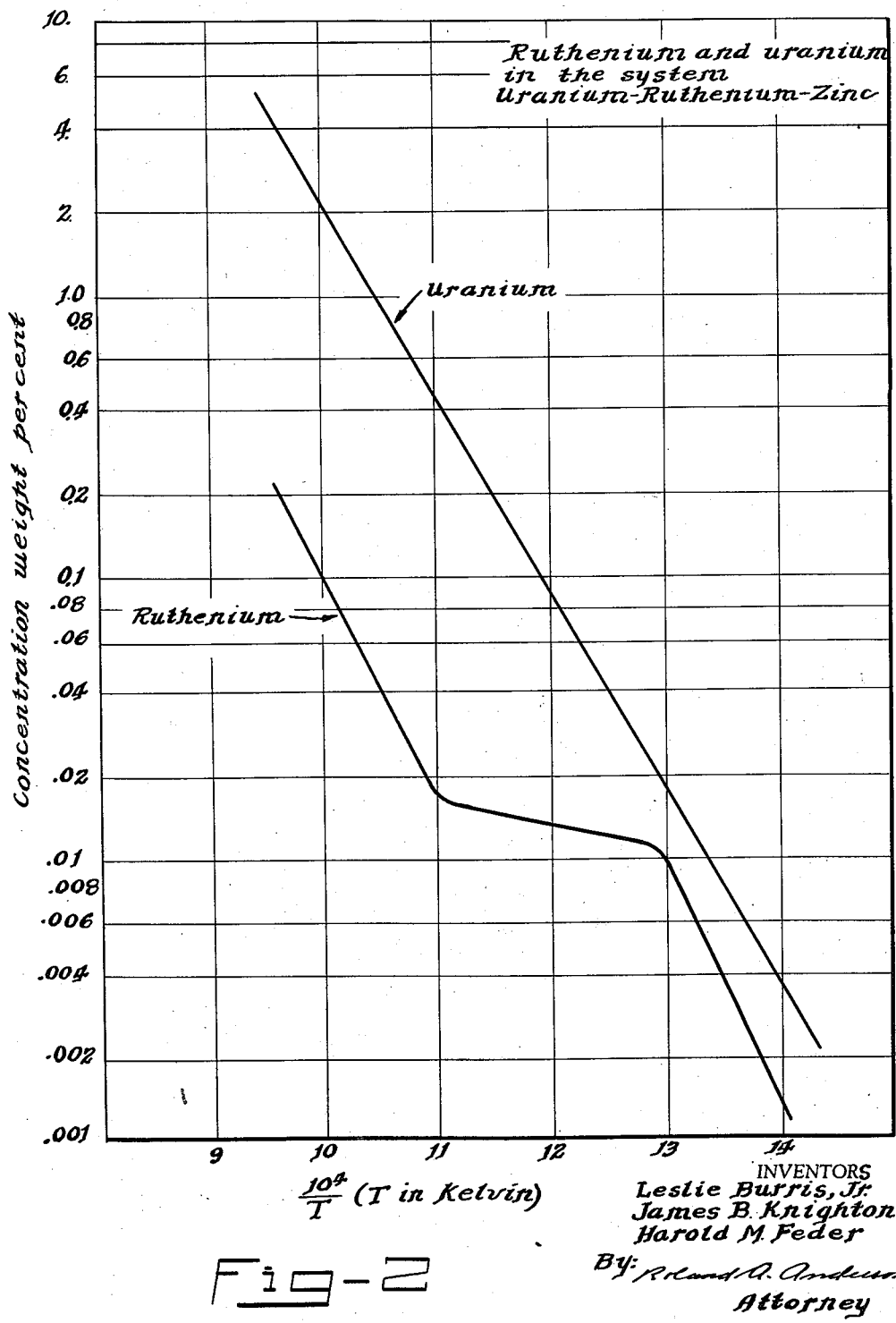

A second recrystallization can be employed to separate the uranium and ruthenium. Table II and Figure 2 plotted therefrom shows how this is possible. Figure 2 includes points obtained both in run 25 and in run 77.

Table II

[Run #25—cooling rate=50° C./hour.]

| Temp., ° C. | U | Ru |
|---|---|---|
| 800 | 4.78 | .199 |
| 750 | 2.98 | .145 |
| 700 | 1.26 | .0539 |
| 650 | .476 | .0332 |
| 600 | .239 | .0142 |
| 550 | .066 | .0132 |
| 500 | .041 | .0107 |

[Run #77—cooling rate=25° C./hour.]

| Temp., ° C. | U | Ru |
|---|---|---|
| 800 | 2.87 | .042 |
| 750 | 2.94 | .057 |
| 698 | 1.41 | .066 |
| 678 | .844 | .033 |
| 652 | .407 | .015 |
| 624 | .281 | .0154 |
| 595 | .229 | .0162 |
| 580 | .120 | .0151 |
| 558 [1] | .021 | .0103 |
| 528 [1] | .022 | .0087 |
| 502 | .019 | .0112 |
| 478 | .015 | .0052 |
| 455 | .0058 | .0022 |

[1] These points disregarded—analytical error.

Between the temperatures of 640° C. and 500° C. the solubility of ruthenium in zinc in the presence of uranium does not drop nearly as fast as the solubility of uranium drops. Thus, there is a change in the behavior of ruthenium over that shown in Figure 1 where other elements are present, and ruthenium can be separated from uranium by recrystallization from a ternary system of uranium, ruthenium, and zinc.

The invention will next be described with relation to the simultaneous reduction and purification of binary compounds of uranium such as $UO_2$, $UO_3$, and $UF_4$. Here again the invention may be applied to the processing of spent fuel materials or to the processing of uranium compounds obtained during a process for the beneficiation and purification of ores. The reduction is according to the following equations:

$$UO_2 + 2Mg + 9Zn \rightarrow 2MgO + UZn_9$$
$$UO_3 + 3Mg + 9Zn \rightarrow 3MgO + UZn_9$$
$$UF_4 + 2MG + 9Zn \rightarrow 2MgF_2 + UZn_9$$

This aspect of the invention differs from that already described only in the fact that an alloy of zinc and magnesium is used as the solvent. Thus uranium oxide, for example, is added to an alloy of zinc and magnesium at a temperature of not more than 850° C., and the mixture is stirred and retained at this temperature until the reaction is substantially completed. It is then cooled to 500° C., the crystals of $UZn_9$ filtered off, and the $UZn_9$ decomposed as before. An example illustrating this reduction follows:

187.5 grams Zn and 12.5 grams Mg were heated to 800° C. in a furnace purged with argon. 11.3 grams of 100-mesh $UO_2$ were added, and the mixture was heated for an hour and one-half with mixing. The hot solution was filtered through grade 40 porous graphite (90-micron pore size) and the filtrate was permitted to solidify. Examination of a section of the ingot indicated the presence of $UZn_9$. It was determined by calculation from analytical results that at least 56 percent of the $UO_2$ was reduced.

An additional test was made to show the reduction of $UO_3$ with zinc-12 w./o. magnesium alloy. 512.4 grams of an ingot prepared from 515.5 grams zinc and 32.5 grams magnesium was combined with 28.6 grams magnesium and 12.6 grams 100-mesh $UO_3$. This was heated at 800° C. for four hours with mixing with a tantalum stirring rod. After cooling the ingot showed evidence of good reduction. No unreacted $UO_3$ was evident under microscopic examination and large crystals of $UZn_9$ were observed at the bottom of the ingot.

An additional experiment was made to demonstrate the reduction of $UF_4$. A mixture of 487.4 grams Zn–Mg ingot (6 percent Mg.), 12 grams magnesium, 135 grams zinc, and 32.8 grams $UF_4$ was heated at 750° C. for one hour in an atmosphere of helium. The hot solution was then filtered. Examination of the ingot obtained on cooling indicated that the uranium had been reduced to $UZn_9$.

It is thus clear that binary compounds of uranium can be reduced and simultaneously purified by fractional crystallization from zinc employing magnesium as reductant. It is believed that other solvents such as cadmium can be employed, and that similar processes can be developed for the purification of plutonium.

It will be understood that this invention is not to be limited to the details given herein, but that it may be modified wihin the scope of the appended claims.

What is claimed is:

1. A pyrometallurgical method for the reduction of uranium compounds to metallic uranium comprising adding the uranium compounds to a melt of an alloy of zinc and magnesium, cooling the mixture until $UZn_9$ crystallizes therefrom, separating the $UZn_9$ from the liquid zinc, and distilling zinc from the uranium to produce metallic uranium.

2. A method according to claim 1 in which the uranium compounds are added at 800° C. and $UZn_9$ is crystallized from the solution at 500° C.

3. A method according to claim 1 in which the alloy is 6 percent Mg and 94 percent Zn.

4. A method according to claim 1 in which a plurality of fractional crystallizations are employed.

5. A method according to claim 2 in which the uranium compound is $UO_2$.

6. A method according to claim 2 in which the uranium compound is $UO_3$.

7. A method according to claim 2 in which the uranium compound is $UF_4$.

8. A pyrometallurgical method for the purification of uranium metal from used nuclear reactor fuel elements comprising dissolving the fuel element in Zn, cooling the solution until $UZn_9$ crystallizes therefrom, separating the $UZn_9$ from the liquid zinc thereby removing fission products from the uranium, and distilling the $UZn_9$ to remove zinc therefrom thereby producing pure uranium metal.

9. A method according to claim 8 in which the uranium compounds are dissolved at 800° C. and $UZn_9$ is crystallized from the solution at 500° C.

10. A method according to claim 8 in which a plurality of fractional crystallizations are employed.

References Cited in the file of this patent

UNITED STATES PATENTS

| | | |
|---|---|---|
| 1,728,940 | Marden | Sept. 24, 1929 |
| 1,728,942 | Marden | Sept. 24, 1929 |
| 2,471,899 | Regner | May 31, 1949 |
| 2,778,730 | Spedding et al. | Jan. 22, 1957 |

OTHER REFERENCES

Bureau of Mines Report of Investigations, 5007, pages 16, 17.

Chiotti et al.: "Journal of Metals," January 1957, pages 51–57.